US012650344B2

(12) United States Patent
Hutzler et al.

(10) Patent No.:  US 12,650,344 B2
(45) Date of Patent:      Jun. 9, 2026

(54) HEAT PROTECTIVE CASING

(71) Applicant: AHMT GMBH INDUSTRIAL APPLICATIONS, Berlin (DE)

(72) Inventors: Aaron Hutzler, Berlin (DE); Jakub Kotrc, Berlin (DE)

(73) Assignee: AHMT GMBH INDUSTRIAL APPLICATIONS, Berlin (DE)

( * ) Notice: Subject to any disclaimer, the term of this patent is extended or adjusted under 35 U.S.C. 154(b) by 756 days.

(21) Appl. No.: 18/011,490

(22) PCT Filed: Jun. 16, 2021

(86) PCT No.: PCT/EP2021/066236
§ 371 (c)(1),
(2) Date: Dec. 19, 2022

(87) PCT Pub. No.: WO2021/255090
PCT Pub. Date: Dec. 23, 2021

(65) Prior Publication Data
US 2023/0258505 A1      Aug. 17, 2023

(30) Foreign Application Priority Data

Jun. 17, 2020      (EP) ..................................... 20180408

(51) Int. Cl.
*G01K 1/12*            (2006.01)
*G01K 1/14*            (2021.01)
(52) U.S. Cl.
CPC ................. *G01K 1/12* (2013.01); *G01K 1/14* (2013.01)

(58) Field of Classification Search
CPC ........... G01K 1/12; G01K 1/14; G01D 11/245
See application file for complete search history.

(56) References Cited

U.S. PATENT DOCUMENTS

| | | |
|---|---|---|
| 10,681,838 B2 | 6/2020 | Chen et al. |
| 2015/0140888 A1 | 5/2015 | Lee et al. |
| 2017/0043562 A1 | 2/2017 | Chatzi et al. |
| 2019/0082557 A1 | 3/2019 | Chen |

FOREIGN PATENT DOCUMENTS

| | | |
|---|---|---|
| CN | 207964104 | 10/2018 |
| CN | 111132479 | 5/2020 |
| JP | 2002-139193 A2 | 5/2002 |
| JP | 2007-139757 A2 | 6/2007 |
| JP | 2012-079858 A2 | 4/2012 |
| JP | 2014-059259 A2 | 4/2014 |
| JP | 2015-014326 A2 | 1/2015 |
| JP | 2015-161655 A2 | 9/2015 |
| JP | 2017144640 A | 8/2017 |
| JP | 2019-190667 A2 | 10/2019 |
| WO | WO2017043562 A1 | 3/2017 |

*Primary Examiner* — Michael C Miggins
(74) *Attorney, Agent, or Firm* — Miller Canfield

(57) ABSTRACT

The invention relates to heat protective casings (1) for accommodating an item (19) to be protected from high temperatures outside (12) of the casing (1). In order to improve usability of the casing (1) and of the item (19), the invention provides that the casing (1) comprising a side (2) with at least a first side wall layer (3) and a second side wall layer (4) extending along the side (2), wherein a thermal property of the first side wall layer (3) differs from a thermal property of the second side wall layer (4).

18 Claims, 4 Drawing Sheets

HEAT PROTECTIVE CASING

TECHNICAL FIELD

The invention relates to a heat protective casing.

BACKGROUND OF THE INVENTION

Heat protective casings for accommodating temperature measurement equipment are well known in the art and are widely used to protect parts of temperature measurement equipment, that may be damaged by the temperature outside of the heat protective casing, e.g. when the heat protective casing is arranged in an oven, for example an oven used for soldering.

In order to protect the parts of temperature measurement equipment, that may be damaged by the temperature outside of the heat protective casing, known heat protective casings are large and/or heavy, which make handling of the casings difficult, are porous, which makes the casing unsuitable for usage in vacuum, or are made of a metal, which has a high heat storage capacity, but which blocks wireless signals sent or to be received by the temperature measurement equipment.

SUMMARY OF THE INVENTION

In view of the above-mentioned disadvantages, an object of the invention may be to provide a heat protective casing for accommodating temperature measurement equipment, which can be easily handled and used in vacuum and that allows wireless signals to pass.

This object is achieved according to the invention in that heat protective casing comprises a side with at least a first side wall layer and a second side wall layer extending along the side, wherein a thermal property of the first side wall layer differs from a thermal property of the second side wall layer.

Due to the at least two layers with different thermal properties, the temperature measurement equipment is well protected in the casing against too high temperatures, wherein the casing can be made relatively lightweight and of a material essentially transparent for wireless signals in bands often used for wireless electromagnetic communication.

The solution according to the invention can be further improved by the embodiments mentioned in the following, which, unless explicitly mentioned to the contrary, can be combined as desired. The embodiments and their possible advantages are elaborated below:

According to an embodiment, the first side wall layer is formed with a first density and the second side wall layer is formed with a second density, wherein the first density differs from the second density. For example, the amount or size or pores or cavities in the first side wall layer may differ from the amount or size or pores or cavities in the second side wall layer to cause the difference in density.

An advantage of this embodiment may be that side wall layers with different densities already due to the different densities can have different thermal properties, wherein the side wall layers can be made or even consist of different types of materials or of the same type of material.

According to an embodiment, at least one of the first and second side wall layers is formed with a density that changes along a predetermined direction. For example, the amount or size or pores or cavities may change along the predetermined direction to cause the change of density.

An advantage of this embodiment may be that the thermal property of the first and/or the second side wall layer can be adapted location- or position-dependent, such that heat protection can be placed in a required position of the casing.

According to an embodiment, the first side wall layer is formed with a first filling level and the second side wall layer is formed with a second filling level, wherein the first filling level differs from the second filling level.

Filling level a.k.a. infill refers to the percentage of filling in a 3D object that may have been made by additive manufacturing like printing, e.g. by using the FDM (Fused Deposition Modeling) process.

An object that has an infill of 0% is hollow inside and one with an infill of 100% is completely solid inside.

In particular, a higher filling level may cause a higher thermal capacity compared to a lower filling level.

A lower filling level may cause a higher heat isolation and possibly a lower thermal conductivity compared to a higher filling level.

Hence, an advantage of this embodiment may be that the respective thermal property, e.g. the thermal conductivity and/or the thermal capacity, of each of the side wall layers, can be easily predetermined by constructing the respective side wall layer with the predetermined filling levels, for example when constructing the 3D object for additive manufacturing like 3D printing.

According to an embodiment, at least one of the first and second side wall layers is formed with a base material and with a filler material in the base material. For example, the base material may comprise pores or cavities, wherein the pores or cavities are at least partly or sectionwise filled with the filler material. The filler material may have the same or a different chemical composition as the base material.

An advantage of this embodiment may be that the thermal property of first and/or second side wall layer can be further optimized due to the combination of the base material and the filler material.

Filler materials may be particles added to the base material, e.g. resin or binders (plastics, composites, concrete), that can improve specific properties, make the product cheaper, or a mixture of both.

According to an embodiment, the base material is a polymer and the filler material composite material.

An advantage of this embodiment may be that the thermal property of first and/or second side wall layer can be further optimized due to the combination of the base material and the composite material. Additionally, as composite materials as such are stronger, lighter, or less expensive when compared to non-composite materials, the stability of the casing can be increased or the weight of the casing can be reduced without increasing material costs.

A composite material (also called a composition material or shortened to composite, which is the common name) may be a material made from two or more constituent materials with significantly different physical or chemical properties that, when combined, produce a material with characteristics different from the individual components. The individual components may remain separate and distinct within the finished structure, differentiating composites from mixtures and solid solutions.

According to an embodiment, the first side wall layer is formed with a first base material and with a first filler material in the first base material, and the second side wall layer is formed with a second base material and with a second filler material in the second base material, wherein the type and/or the relative filling level of the first filler material differs from the type and/or the relative filling level of the second filler material. For example, the filling level may designate the level the filler material fills the pores or cavities. Alternatively or additionally, the filling level may designate the relative volume of space inside the respective side wall layer filled or not filled at all and in particular not filled with the base or the filler material. Hence, air may remain in the not filled volume.

An advantage of this embodiment may be that the thermal property can be easily and precisely influenced during the production of the first and/or second side wall layer.

According to an embodiment, that the first base material comprises at least a first polymer and/or the second base material comprises at least a second polymer, wherein the type of the first polymer is the same as or differs from the type of the second polymer.

An advantage of this embodiment may be that not only thermal, but also other properties like chemical properties of the respective first or second side wall layer can be adapted as required.

According to an embodiment, the first filler material comprises at least a first composite material and/or the second filler material comprises at least a second composite material, wherein the type or a structural direction of the first composite material is the same as or differs from the type or a structural direction of the second composite material.

An advantage of this embodiment may be that the not only thermal, but also other properties like mechanical properties of the respective first or second side wall layer can be adapted as required.

According to an embodiment, at least one of the first and second side wall layers is formed with a structural orientation. The structural orientation may be caused by a preferred direction of elements like carbon fibers implemented in the respective side wall layer.

An advantage of this embodiment may be that due to the structural orientation, mechanical and/or thermal properties can be adapted as desired. For example, due to the structural orientation, thermal conductivity may be higher in one direction and e.g. along the orientation and transverse thereto.

According to an embodiment, the first layer has a first structural orientation and the second layer has a second structural orientation, wherein the first structural orientation differs from the second structural orientation.

An advantage of this embodiment may be that due to the structural orientation, mechanical and/or thermal properties can be adapted as desired.

According to an embodiment, the thermal property is thermal conductivity, wherein at least one of the first and second side wall layers comprises a predefined maximum thermal conductivity in a predefined direction.

An advantage of this embodiment may be that heat can be effectively conducted away from heat sensitive areas of an item placed inside the casing.

According to an embodiment, the first side wall layer has a first predefined maximum thermal conductivity in a first predefined direction, and the second side wall layer has a second predefined maximum thermal conductivity in a second predefined direction, wherein the absolute value of the first predefined maximum thermal conductivity differs from the absolute value of the second predefined maximum thermal conductivity and/or wherein the first direction differs from the second direction.

An advantage of this embodiment may be that heat can be even more effectively conducted away from heat sensitive areas of an item placed inside the casing.

The different thermal conductivities along first and/or second predetermined directions may be achieved by the usage of the filler material, which may be carbon fibers arranged in at least on certain direction, which may align with the predetermined direction.

According to an embodiment, the predetermined direction extends along and outer side of the respective one of the first and second side wall layer. As a result, the thermal conductivity of the first and/or the second side wall layer may be minimal perpendicular to an outer side of the respective one of the first and second side wall layer.

An advantage of this embodiment may be that heat is effectively conducted along the outer side wall and not perpendicular thereto, i.e. not into the inside of the casing.

According to an embodiment, the first and the second side wall layers are arranged with a distance to each other.

An advantage of this embodiment may be that due to the distance between the first and second side wall layers, a gap between the side wall layers exists. The gap hinders conduction of heat, such that the heat conductivity from outside to inside the casing is advantageously reduced.

According to an embodiment, the casing comprises an outer receptacle and an inner receptacle, wherein the outer shape of the inner receptacle is at least sectionwise complementary to an inner receiving volume of the outer receptacle, and wherein the side of the casing comprises adjacent side walls of the inner and the outer receptacle, the adjacent side wall of the inner receptacle comprising one of the first and second side wall layers and the adjacent side wall of the outer receptacle comprising other one of the first and second side wall layers.

An advantage of this embodiment may be that an item can be easily placed in the inner receptacle without the need to handle the complete casing, wherein the inner receptacle can be easily placed in the outer receptacle. For example, the outer receptacle can be mounted inside of an oven, such that it is assured that the casing as such is always placed in the oven in the very same position, wherein the item can be easily placed in the inner receptacle outside of the oven.

The inner receptable may be referred to as inner housing and the outer receptacle may be referred to as outer housing.

According to an embodiment, in a state in which the inner receptacle is placed in its inserted position, in which the inner receptacle is at least partly arranged in the receiving volume, a gap is present between the adjacent sides.

An advantage of this embodiment may be that due to the gap conduction of heat is hindered, such that the heat conductivity from outside to inside the casing is advantageously reduced.

According to an embodiment, the casing has an outer contact section for contacting an inner side of an oven, wherein the total surface of the outer contact section is larger than the total surface of at least one outer side of the casing that is outside of the outer contact section. The outer contact section may be designated as heat distribution section or shield.

An advantage of this embodiment may be that heat can be conducted away from the inside of the casing via the contact section more effectively due to the total surface of the contact section.

The heat protective casing may comprise at least one electrical contact element for electrically contacting an item inside of the casing and for example for electrically connecting the item to another item inside and/or outside of the casing.

An advantage of this embodiment may be that an item inside the casing, e.g. temperature measurement equipment or a battery, can be electrically connected.

Set of at least two heat protective casings, wherein the two heat protective casings comprise the at least one electrical contact element and wherein the casings are adapted to be interconnected via the electrical contact elements.

An advantage of this embodiment may be that several casings can be electrically interconnected in a modular manner.

The at least one electrical contact element may contact a thermally isolating element, e.g. a thermally isolating foil, in particular at its outer side that faces away from its inside. The thermally isolating element may comprise a thermal conductivity of <0.1 W/mK at room temperature and may for example comprise calcium-magnesium-silicate-fibre.

An advantage of this embodiment may be that heat conduction via the electrical contact element into the inside of the casing can be reduced.

The heat protective casing may comprise at least one groove that extends along its inner side and/or alone its outer side, the groove providing for an inlay channel for at least one cable.

An advantage of this embodiment may be that a cable can be guided such that the cable does not affect handling of the casing or does not contact hot surfaces of an oven in which the casing is arranged that could potentially damage the cable.

The heat protective casing may comprise duct that may extend through at least one of the first and the second side wall layer and interconnect the outside of the casing with its inside.

An advantage of this embodiment may be that an electrical or thermal conductor and e.g. a cable, for example for connecting a power source or sink or a thermal sensor, can extend from the outside to the inside of the casing.

The groove may contact the duct.

An advantage of this embodiment may be that a cable guided by the groove can extend from the outside to the inside of the casing.

The heat protective casing may be a heat protective casing for accommodating temperature measurement equipment or a battery casing, whose inside may be at least partly formed complementary to the temperature measurement equipment or to at least one battery to be placed inside of the casing.

An advantage of this embodiment may be that the temperature measurement equipment or the at least one battery can be arranged inside of the casing without too much clearance.

The thermal property may be a property of the respective side wall layer as such. For example, the thermal property may be thermal conductivity and/or thermal capacity, which may also be referred to as heat storage capacity.

At least some of the materials the first and/or second side wall layers comprise may be polymers that as such or in combination with the filler material or the composite material have a thermal stability is adapted to withstand the processing temperatures inside of an oven, the oven for example being a tempering or soldering oven with processing temperatures of up to 360° C., up to 300° C., up to 260° C. or up to 250° C. For example, such polymers can be designated as high-performance plastics and may be PEEK, PA1, PI, PPS, PPSU, PFE, PEK, PE1, PTFE or other suitable polymers.

The polymers may be filled with a filler material like carbon-fiber or glass fiber or a phase change material suitable for usage with the polymers or the other materials of the casing and at the temperatures the casing is to be used in. For example, the phase change material may be a low melting metal or paraffin.

The filling level of the polymer can be between 0% and 99%, for example above 10%, 20%, 30%, 40% or 50% or below 90%, 80%, 70%, 60% or 50%.

The porosity of the polymers may result in a polymer density between 3% and 100%, for example above 10%, 20%, 30%, 40% or 50% or below 90%, 80%, 70%, 60% or 50%.

The casing may comprise a clamping mechanism for pressing the outer contact section against a heat sink.

An advantage of this embodiment may be that a good mechanical contact between the outer contact section against and the heat sink is assured, which improved the thermal connection between the outer contact section against the heat sink.

At least the first and/or second side wall layer can be formed by additive manufacturing and for example by 3D-printing. In particular, the 3D-printed first and/or second side wall layer can be printed with varying thermal property and e.g. with varying density and/or amount of filler or composite materials. The filler material can be added during the printing process.

The casing can be printed around the battery and optionally also around the at least one electrical contact element, such that the battery is completely enclosed by the casing, which, hence, may be free of any closing or latching mechanisms to fix lids or the like in a closed position.

A low density or filling level may result in a low thermal conductivity, wherein a high thermal capacity may be advantageously maintained.

According to an embodiment, the side may comprise more side wall layers than the first and the second side wall layers and for example in addition to the first and second side wall layers at least one further side wall layer, whose thermal property may differ from the thermal property of at least one of the first and second side wall layers, in particular as described above with respect to the first and second side wall layers. Selected or all of the side wall layers may have a thermal property that differs from the thermal property of at least one of the other side wall layers. In particular, the wall layers may have filling levels that differ from each other. For example, the first side wall layer may have an infill of <25%. The second side wall layer may have an infill of >=25%. The third side wall layer may have an infill of <25%.

According to an embodiment, the side wall layers may be order such that a side wall layer with a relatively higher filling level follows a side wall layer with a relatively higher filling level or vice versa. Again, more than two side wall layers may be stacked, such that such that a side wall layer with a relatively higher filling level follows a side wall layer with a relatively higher filling level and so on or vice versa.

The wall layers may be 3D printed.

BRIEF DESCRIPTION OF THE DRAWINGS

The invention is described hereinafter in more detail and in an exemplary manner using advantageous embodiments and with reference to the drawings. The described embodiments are only possible configurations in which, however, the individual features as describes above can be provided independent of one another or can be omitted in the drawings.

DETAILED DESCRIPTION OF THE INVENTION

Figure 1:
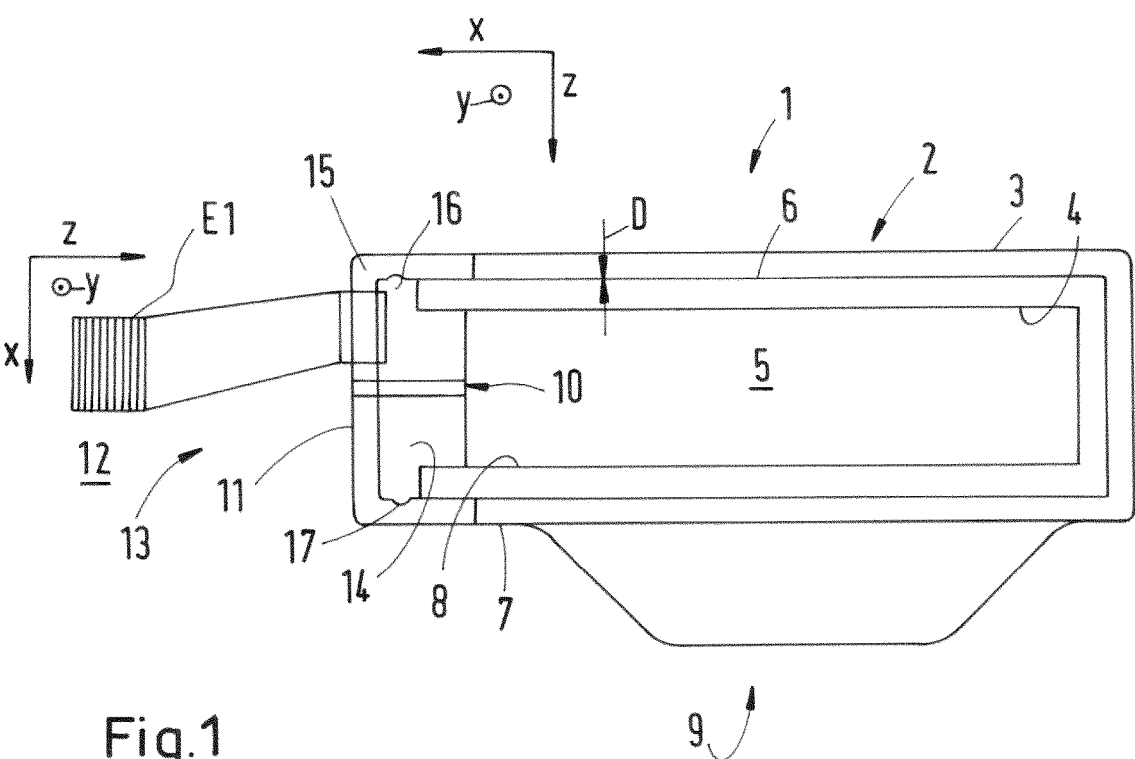
FIG. 1 is a schematic cross-sectional view of a first embodiment of the casing, \

FIG. 1 shows a first exemplary embodiment of a heat protective casing 1 according to the invention. The casing 1 comprises a side 2 with at least a first side wall layer 3 and the second side wall layer 4. The first and second side wall layers 3, 4 extend along the side 2 and for example along a X- and/or Y-direction of the side 2. A Z-direction of the side 2 extends perpendicular to the side 2 and in particular towards an inside 5 of the casing 1. A thermal property, for example the thermal conductivity and/or the thermal capacity of the first side wall layer 3 differs from the thermal property and for example from the thermal conductivity and/or the thermal capacity of the second side wall layer 4.

For example, the first side wall layer 3 may be formed with a first density, and the second side wall layer 4 may be formed with a second density. In order to provide for the difference in the thermal properties, the first density may differ from the second density.

In order to vary the thermal property along any of the directions X, Y, Z, the density of the first side wall layer 3 and/or of the second side wall layer 4 may change or vary along the respective direction calculator X, Y, Z.

The first side wall layer 3 and/or the second side wall layer 4 may be formed with a base material, for example polymer, and with a filler material, e.g. a composite material, in the base material. Variations or differences in filling levels of the filler material in the base material may cause the variations or differences in the thermal property. A filling level may correspond to a ratio of the base material to the filler material or vice versa.

The first side wall layer 3 may be formed with a first base material, and the second side wall layer may be formed with a second base material, wherein the first and second base materials may be the same material or may be different materials.

The first side wall layer 3 may be formed with a first filler material, and the second side wall layer 4 may be formed with a second filler material, wherein the first and second filler materials may be the same material or may be different materials.

The first side wall layer 3 may be formed with a first filling level, and the second side wall layer 4 may be formed with a second filling level, wherein the first and second filling levels may be the same filling level or may be different filling levels.

The first side wall layer 3 may be formed with a first filling level and/or density gradient, and the second side wall layer 4 may be formed with a second filling level and/or density gradient, wherein the first and second filling level and/or density gradients may be identical or may differ from each other in size and/or direction.

The first side wall layer 3 and/or the second side wall layer 4 may be formed with a structural orientation. The structural orientation of the first side wall layer 3 may be identical to or may differ from the structural orientation of the second side wall layer 4.

In particular, the first filler material may comprise at least a first composite material, and/or the second filler material may comprise at least a second composite material. The type and/or a structural direction of the first composite material may be the same as or may differ from the type and/or a structural orientation of the second composite material.

The first side wall layer 3 and/or the second side wall layer 4 may be formed with a predefined maximum thermal conductivity in a predefined direction. In particular, the predefined direction may be a direction that is essentially extends perpendicular to the Z-direction of the side 2.

The first side wall layer 3 may have a first predefined maximum thermal conductivity in a first predefined direction, and the second side wall layer 4 may have a second predefined maximum thermal conductivity in a second predefined direction. The absolute value of the first predefined maximum thermal conductivity may differ from the absolute value of the second predefined maximum thermal conductivity. Alternatively or additionally, the first predefined direction may differ from the second predefined direction.

For example, the second thermal conductivity of the second side wall layer 4 may be less than the first thermal conductivity of the first side wall layer 3, in particular in case the second side wall layer 4 is arranged between the first side wall layer 3 and the inside 5 of the casing 1 along the Z-direction.

The first side wall layer 3 may have a first predefined thermal capacity, and the second side wall layer 4 may have a second predefined thermal capacity. The absolute value of the first predefined thermal capacity may differ from the absolute value of the second predefined thermal capacity. In particular, the second thermal capacity of the second side wall layer 4 may be higher than the first thermal capacity of the first side wall layer 3.

The first side wall layer 3 may be arranged with a distance D to the second side wall layer 4, in particular along the Z-direction. Thus, a gap 6 may be present between the first side wall layer 3 and the second side wall layer 4.

The first side wall layer 3 may be part of an outer receptacle 7, and the second side wall layer 4 may be part of an inner receptacle 8. The inner and/or outer receptacle 7, 8 may comprise additional sides, wherein each of the side comprises X-, Y- and Z-directions, the Z-direction always pointing into the inside 5 of the casing 1. Selected or all of the sides may comprise at least a first side wall layer and a second side wall layer, wherein the first side wall layers may be identical to each other and the second side wall layers may be identical to each other. The first side wall layers may be continuous layers. The second side wall layers may be continuous layers.

The outer shape of the inner receptacle 8 may at least sectionwise be formed complementary to an inner receiving volume of the outer receptacle 7.

In particular in a state in which the inner receptacle 8 is placed in its inserted position shown in FIG. 1, in which the inner receptacle 8 is at least partly and in particular completely arranged in the receiving volume, the gap 6 may be present between lateral sides of the outer receptacle 7 and the inner receptacle 8, the lateral sides facing each other.

The casing 1 may have an outer contact section 9 for contacting a heat sink, for example an inner side of an oven. The total surface of the outer contact section 9 may be larger than the total surface of at least one outer side of the casing 1 that is outside of the outer contact section 9. The outer contact section 9 may be formed by the first side wall layer 3 or may be separately provided from the first side wall layer 3 and affixed to the side layer 3. In case the outer contact section 9 is provided separately, the outer contact section 9 may be formed of a material with a high thermal conductivity, for example a metal.

The casing 1 may comprise a duct 10 that extends through one of the sides of the casing 1 and for example through a side 11 that shares a coroner of the casing 1 will the side 2. The duct 10 may extend from the inside 5 of the casing 1 to an outside 12 of the casing 1. In particular, the duct 10 may extend parallel to the Z-direction of the side 11.

The enlarged section E1 of the side 11 schematically shows the structural orientation of the first side wall layer 3 along the X- and/or the Y-direction of the side 11. The structural orientation of each of the sides of the casing 1 may be similar along the respective directions of the respective side.

The casing 1 and in particular the outer and inner receptacles 7, 8 may comprise an opening 13 for insertion of an item into the inside 5. For example, the casing 1 and in particular the outer and inner receptacles 7, 8 may comprise a U-shaped cross-section, which forms the opening 13.

In an assembled state of the casing 1, the casing 1 may comprise at least one closing element that closes the opening 13. The closing element may at least partly form the side 11 and may comprise the duct 10.

In particular, the casing may comprise a first closing element 14 and a second closing element 15, wherein the first closing element 14 closes the opening 13 of the second side wall layer 4 and the second closing element 15 closes the opening 13 of the first side wall layer 3.

The first closing element 14 may at least sectionwise be formed as a plug that is at least as inserted into the opening 13 and that may abut the inside 5. The first closing element 14 may comprise stop protrusions 16 that rest against front faces of the legs of the U-shaped part of the second side wall layer 4, which prevents that the first closing element 14 can be inserted into the inside 5 of the casing 1 too far.

The second closing element 15 can be formed as a cap that can be placed on the first closing element 14. An outer side of the second closing element 15, which faces away from the inside 5, in particular against the respective Z-direction, may be aligned with an outer side of the first side wall layer 3, which faces away from the inside 5, in particular against the respective Z-direction.

The front face of the second side wall layer 4 and in particular of the inner receptacle 8 may protrude from a front face of the first side wall layer 3 and in particular of the outer receptacle 7 against the Z-direction of the side 11. The second closing element 15 can abut against the front face of the front face of the first side wall layer 3 and in particular of the outer receptacle 7 and can be put over the front face of the second side wall layer 4 and in particular of the inner receptacle 8. The second closing element 15 can be placed over the first closing element 14.

The gap 6 may be present between the closing elements 14, 15. The gap 6 may be interrupted by at least one fixing section 17 of the casing 1, wherein the fixing section 17 provides for a secure fixation between the closing elements 14, 15. For example, the fixing section 17 comprises a protrusion and optionally a recess in order to fix the closing elements 14, 15 to each other in a form- or force-fit manner.

The first closing element 14 may comprise a material combination and/or a structure that corresponds to the second side wall layer 4 or that differs from the second side wall layer 4. For example, the first closing element 14 may be formed of a polymer like PEEK and/or may comprise a density gradient for example in any of the X-, Y-, and Z-directions.

The second closing element 15 may comprise a material combination and/or a structure that corresponds to the first side wall layer 3 or that differs from the first side wall layer 3. For example, the second closing element 15 may have a structural orientation, e.g. caused by a preferred direction of carbon fibers in the material of the second closing element 15, that extends perpendicular to the Z-direction.

Figure 2:
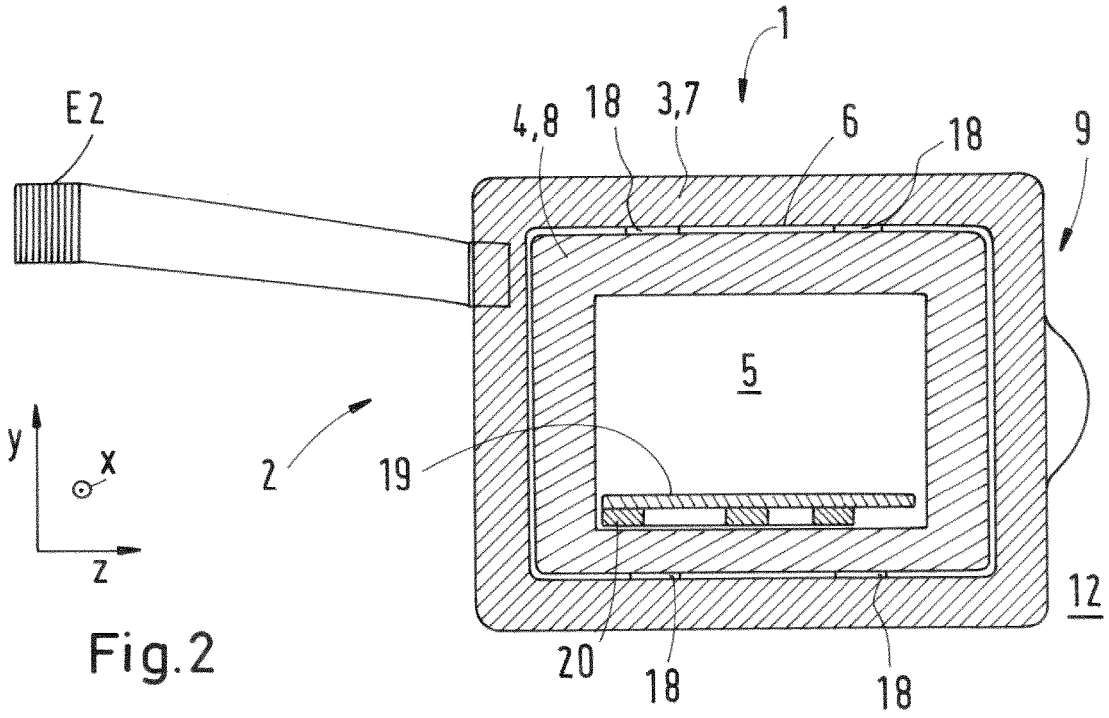
FIG. 2 is a schematic perspective view of a second embodiment of the casing.

FIG. 2 shows another exemplary embodiment of the casing 1 in a cross-sectional view. For elements, which correspond in form and/or function to elements of the previous embodiment, the same reference signs are used. For the sake of brevity, only the differences between the embodiments are discussed.

The casing 1 of the exemplary embodiment of FIG. 2 is formed with the gap 6, wherein the casing 1 comprises a spacing element 18 that provides for the distance D that forms the gap 6. The spacing element 18 may be arranged on a side of the second side wall layer 4 or of the inner receptacle 8 that faces away from the inside 5 of the casing 1. Alternatively, the spacing element 18 may be arranged on a side of the first side wall layer 3 or of the outer receptacle 7 that face to towards the inside 5 of the casing 1. The casing 1 may comprise more than one spacing element 18, wherein the spacing element 18 may be provided on the sides that faces away from or towards the inside 5 of the casing 1. In particular, the casing 1 may comprise at least two spacing elements 18 provided at opposite sides, between which the inside 5 of the casing 1 is arranged. The at least one spacing element 18 may protrude into the gap 6.

E2 designates an enlarged section of the first side wall layer 3, wherein the enlarged section E2 schematically shows the structural orientation of the first side wall layer 3. The structural orientation may essentially extend along the Y- and/or X-direction and may correspond to a general alignment of carbon fibers arranged inside of the second side wall layer 4.

An item 19 is arranged in the inside 5 of the casing 1. The item 19 may be temperature measurement equipment or any other component like a PCB, a battery or another electronic component to be protected from high temperatures outside of the casing 1. The casing 1 may comprise a holding structure 20 for holding the item 19.

Figure 3:
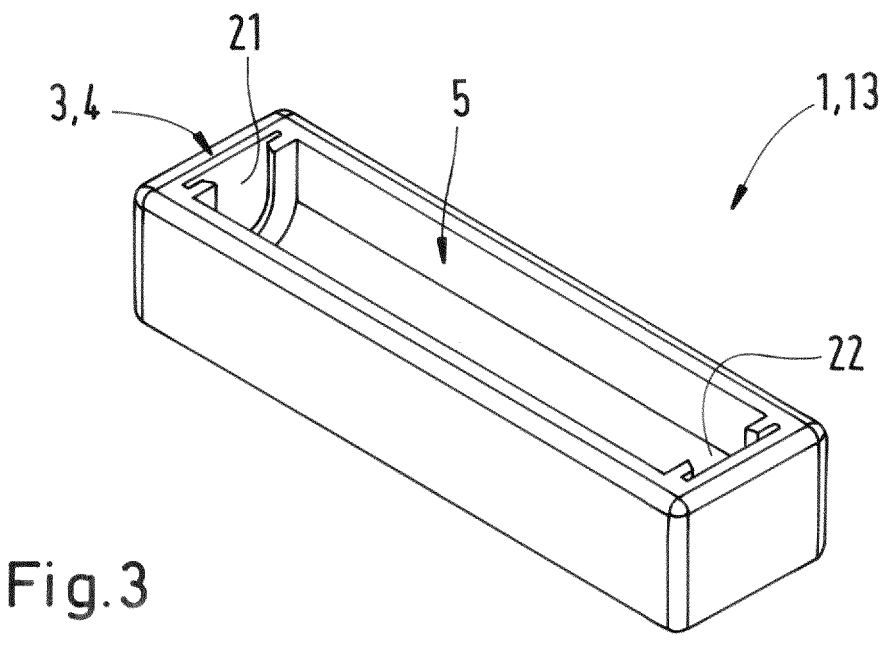
FIG. 3 is a schematic cross-sectional view of a third embodiment of the casing.
Figure 4:
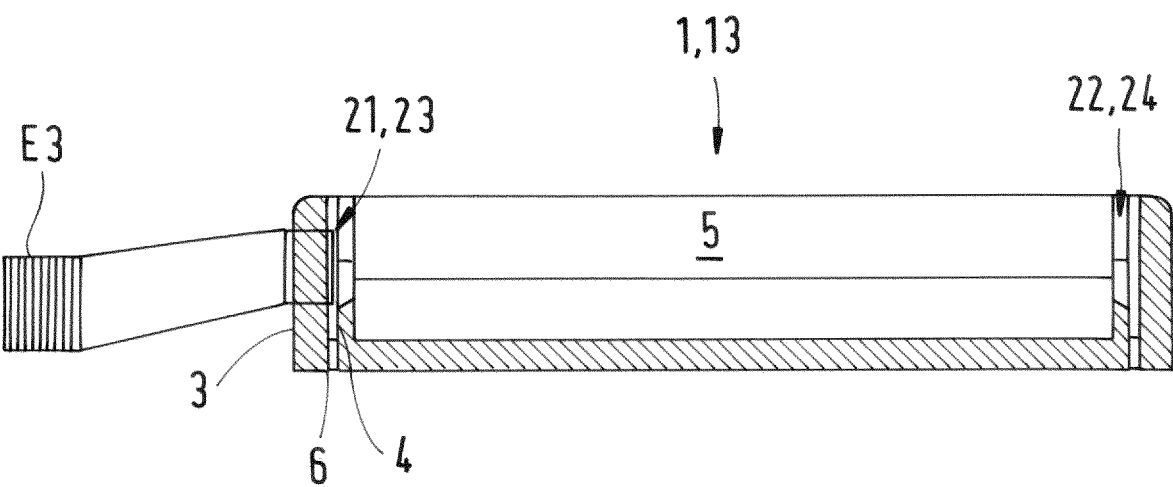
FIG. 4 is a schematic-cross sectional view of the third embodiment of the casing.
Figure 5:
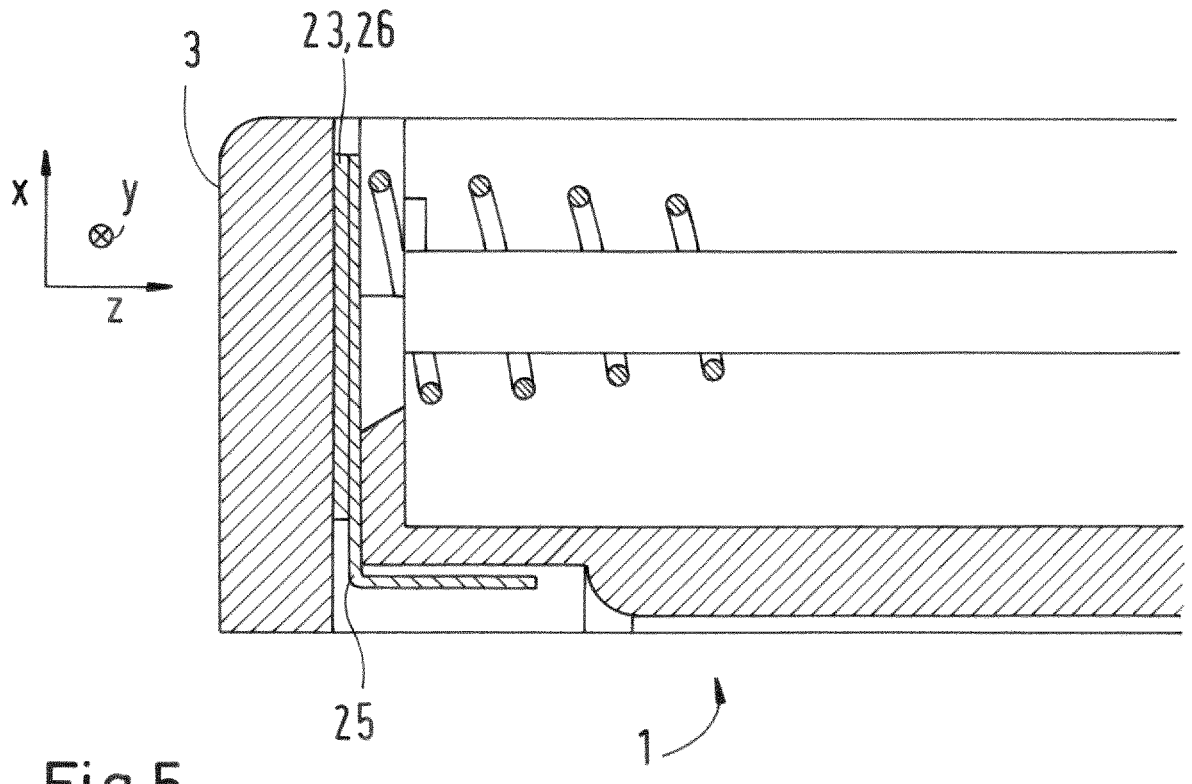
FIG. 5 shows a detail of the third embodiment of the casing.

FIGS. 3 to 5 show another exemplary embodiment of the casing 1 in perspective and cross-sectional views. For elements, which correspond in form and/or function to elements of the previous embodiments, the same reference signs are used. For the sake of brevity, only the differences between the embodiments are discussed.

The heat protective casing 1 of the exemplary embodiment of FIGS. 3 to 5 may be a casing for receiving at least one battery, which may be a cylindrical battery. Hence, the item 19 may be the battery.

The casing 1 may be formed with opposite sides 21, 22, which are designated as contact sides in the following. The contact sides 21, 22 are adapted to receive contact elements for electrically contacting the battery. At the contact sides 21, 22, contact holders 23, 24 are provided, in which a contact element can respectively be inserted and held. The contact element may at least in part be a contact plate 25. Between the contact plate 25 and the first side wall layer 3, a thermally isolating element 26 and for example a heat isolating foil may be placed in the respective contact holder 23, 24.

The gap 6 may continue the contact holder 23, 24 at least partly.

E3 designates an enlarged section of the first side wall layer 3, wherein the enlarged section E3 schematically shows the structural orientation of the first side wall layer 3. The structural orientation may essentially extend along the Y- and/or X-direction and may correspond to a general alignment of carbon fibers arranged inside of the second side wall layer 4.

Figure 6:
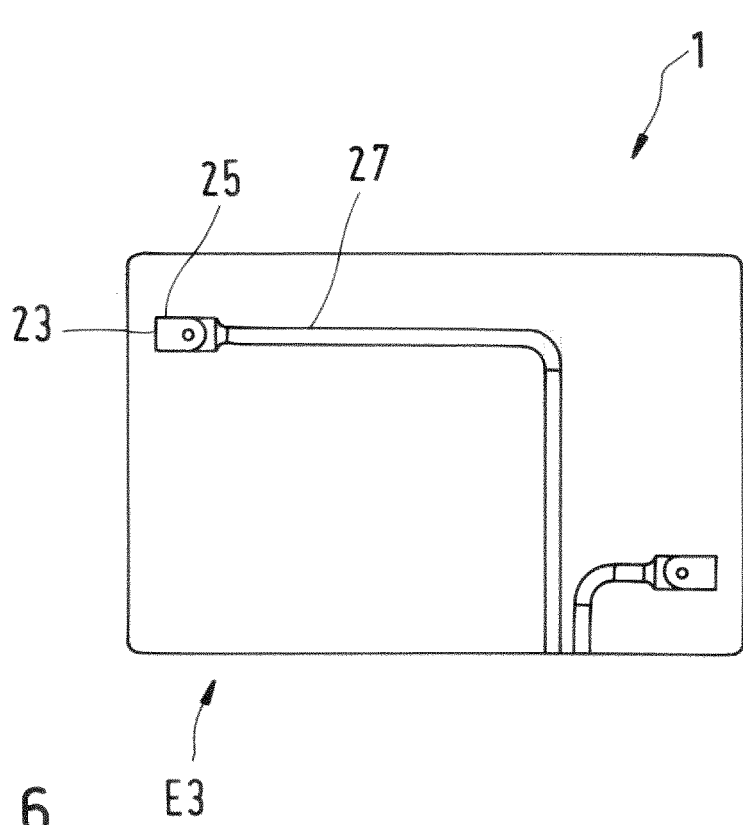
FIG. 6 shows a detail of the casing of any of the previous figures.

FIG. 6 shows a possible detail of the casing 1 of the previous embodiments. For elements, which correspond in form and/or function to elements of the previous figures, the same reference signs are used.

The heat protective casing 1 may comprise at least one groove 27 that extends along its inner side and/or along its outer side. The groove may provide for an inlay channel for at least one cable.

The groove 27 may contact the duct 10. In the exemplary embodiment of FIG. 6, however, the groove 27 contacts the contact holder 23, such that a part of the contact plate 25 may be arranged in the groove 27.

Figure 7:
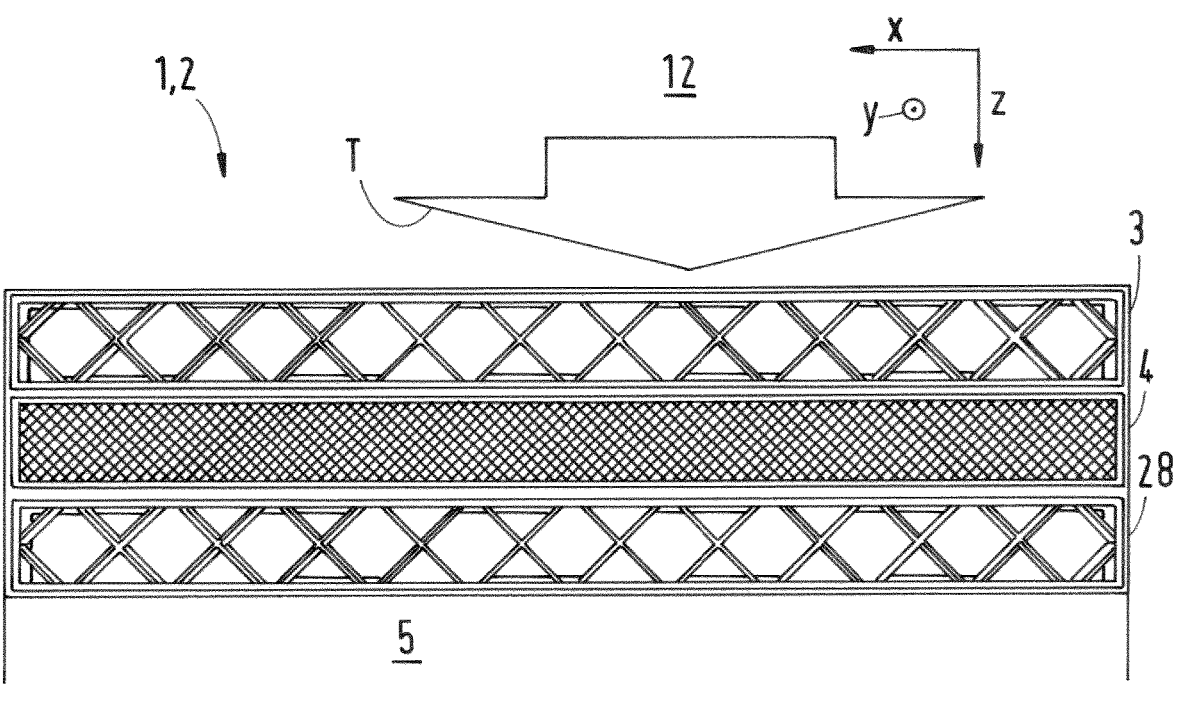
FIG. 7 shows another embodiment of a schematic cross-sectional view of a side of the casing and FIG. 8 shows yet another embodiment of a schematic cross-sectional view of a side of the casing.

FIG. 7 shows another exemplary embodiment of the casing 1 in a schematic and cross-sectional view. For elements, which correspond in form and/or function to elements of the previous embodiments, the same reference signs are used. For the sake of brevity, only the differences between the embodiments are discussed.

The exemplary embodiment of FIG. 7 shows the casing 1 with three side wall layers 3, 4 and 28 that are or stacked, i.e. arranged one behind the other, in the Z direction. For example, the side wall layer with the reference numeral 28 may be designated as third side wall layer. The second side wall layer 4 may be arranged between the first side wall layer 3 and the third side wall layer 28.

The thermal property of at least one of the side wall layers 3, 4 and 28 may differ from the thermal property of at least one of the side wall layers 3, 4 and 28. In the exemplary embodiment shown in FIG. 7, the thermal property of the second side wall layer 4 differs from the thermal property of the first and third side wall layers 3, 28. The thermal properties of the first and third side wall layers 3, 28 may differ from each other. Yet, in the exemplary embodiment shown in FIG. 7, the thermal properties of the first and third side wall layers 3, 28 are similar or even identical.

At least selected or all of the layers 3 and 4 and optionally also 28 may comprise a framework structure with stabs that form compartments. Depending on their size, the compartments may be designated as pores or cavities. The stabs may be formed from the base material.

The compartment sizes of at least one of the side wall layers 3, 4 and 28 may differ from the compartment sizes of at least one of the side wall layers 3, 4 and 28. In the exemplary embodiment shown in FIG. 7, the compartment size of the second side wall layer 4 differs from the compartment size of the first and third side wall layers 3, 28. The compartment sizes of the first and third side wall layers 3, 28 may differ from each other. Yet, in the exemplary embodiment shown in FIG. 7, the compartment sizes of the first and third side wall layers 3, 28 are similar or even identical.

Due to the differences in compartment sizes, the density of the respective side wall layers may differ.

In the first side wall layer 3 of the exemplary embodiment of FIG. 7, merely 5% of the total volume of the first side wall layer 3 is filled, e.g. with the base material, such that the filling level is 5%. Also in the third side wall layer 28, merely 5% of the total volume of the third side wall layer 28 is filled, e.g. with the base material, such that the filling level is 5%. The second side wall layer 4 has a filling level of 50%, as 50% of the total volume of the second side wall layer 4 is filled, e.g. with the base material.

The thermal conductivity of the first side wall layer 3 and/or the third side wall layer 28 may be lower than the thermal conductivity of the second side wall layer 4. Yet, the thermal or heat capacity of the second side wall layer 4 may be higher than the thermal or heat capacity the first side wall layer 3 and/or the third side wall layer 28.

Heat or thermal energy T acting upon the side 2 on the outside 12 of the casing 1, e.g. the heat within an oven of for example 250° C., will be slowly conducted by the first side wall layer 3 along the Z direction. The heat or thermal energy that reaches the second side wall layer 4 can be stored in the second side wall layer 4, such that the temperature of the second side wall layer 4 rises slowly. The third side wall layer 28 hinders the heat or thermal energy emitted by the second side wall layer 4 from entering the inside 5 of the casing 1.

Figure 8:
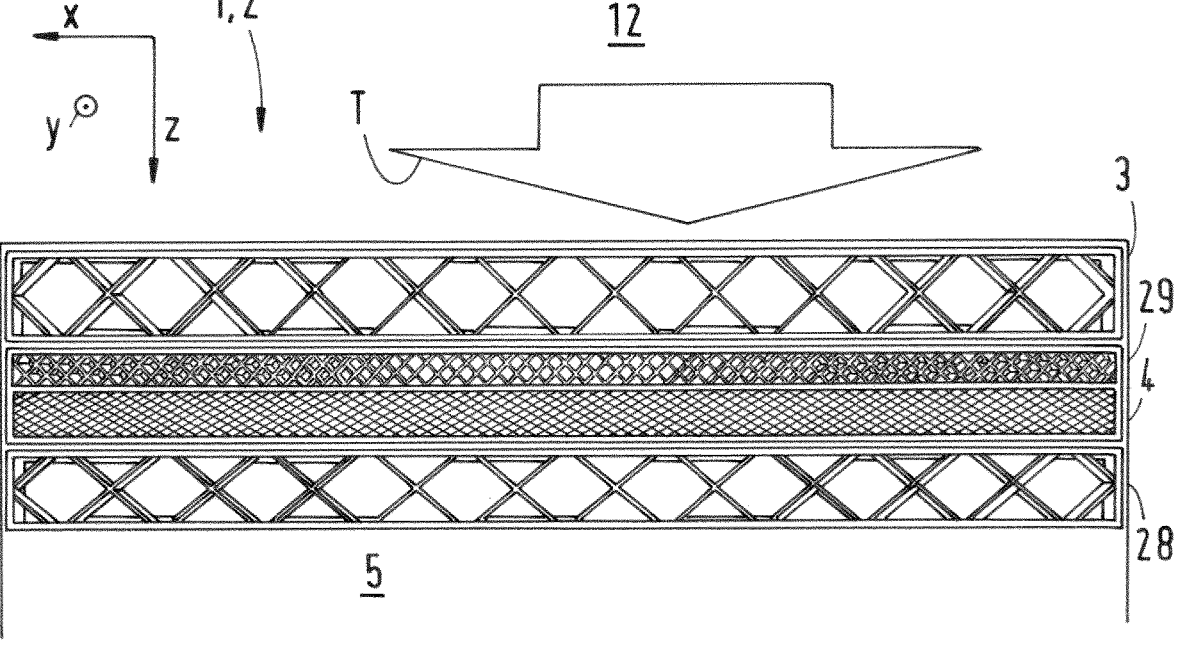

FIG. 8 shows another exemplary embodiment of the casing 1 in a schematic and cross-sectional view. For elements, which correspond in form and/or function to elements of the previous embodiments, the same reference signs are used. For the sake of brevity, only the differences between the embodiments are discussed.

The side 2 shown in FIG. 8 differs from the side 2 depicted in FIG. 7 in that the side 2 of FIG. 8 comprises another side wall layer 29. The other side wall layer 29 may be arranged somewhere in the layer stack that forms the side 2 an comprises also the first side wall layer 3, the second side wall layer 4 and the third side wall layer 28. According to the exemplary embodiment of FIG. 8, the other side wall layer 29 is arranged between the first and the second side wall layers 3, 4, such that the order of the side wall layers along the z-direction and from the outside 12 to the inside 5 may be first, other, second, third side wall layer.

The thermal property of at least one of the side wall layers 3, 4 and 28 may differ from or be the same as the thermal property of the other side wall layers 29. In the exemplary embodiment shown in FIG. 7, the thermal property of the other side wall layer 28 differs from the thermal property of the first, second and third side wall layers 3, 4, 28.

Also the other side wall layer 29 may comprise a framework structure with stabs that form compartments. Depending on their size, the compartments may be designated as pores or cavities. The stabs may be formed from the base material.

The compartment sizes of at least one of the side wall layers 3, 4 and 28 may differ from or be the same as the compartment sizes of the other side wall layers 29. In the exemplary embodiment shown in FIG. 7, the compartment sizes of the other side wall layer 28 differs from the compartment sizes of the first, second and third side wall layers 3, 4, 28.

Due to the differences in compartment sizes, the density of the respective side wall layers may differ.

In the other side wall layer 29 of the exemplary embodiment of FIG. 8, 25% of the total volume of the other side wall layer 29 is filled e.g. with the base material, such that the filling level is 25%.

The thermal or heat capacity of the other side wall layer 29 may be higher than the thermal or heat capacity of the first and/or second side wall layer 3, 4. The thermal or heat capacity of the other side wall layer 29 may be lower than the thermal or heat capacity of the third side wall layer 28.

The thermal conductivity of the other side wall layer 29 may be lower than the thermal conductivity of the first and/or second side wall layer 3, 4. thermal conductivity of the other side wall layer 29 may be higher than the thermal conductivity of the third side wall layer 28.

Heat T acting upon the side 2 on the outside 12 of the casing 1, e.g. the heat within an oven of for example 250° C., will be slowly conducted by the first side wall layer 3 along the Z direction. The heat or thermal energy that reaches the other side wall layer 29 can be stored in the other side wall layer 29, such that the temperature of the other side wall layer 28 rises slowly.

The heat or thermal energy that reaches the second side wall layer 4 can be stored in the second side wall layer 4, such that the temperature of the second side wall layer 4 rises even more slowly compared to the other side wall layer 28. The third side wall layer 28 hinders the heat or thermal energy emitted by the second side wall layer 4 from entering the inside 5 of the casing 1.

REFERENCE SIGNS 1 heat protective casing
2 side
3 first side wall layer
4 second side wall layer
5 inside of casing 1
6 gap
7 outer receptacle
8 inner receptacle
9 outer contact section
10 duct
11 side
12 outside of casing 1
13 opening
14 first closing element
15 second closing element
16 stop protrusion
17 fixing section
18 spacing element
19 item in casing 1
20 holding structure for item 19
21, 22 contact sides
23, 24 contact holder
25 contact plate
26 thermally isolating element
27 groove
28 third side wall layer
29 other side wall layer
E1, 2, enlarged section
3
D distance
T thermal energy
X,Y, directions
Z

The invention claimed is:

1. A heat protective casing comprising a side with at least a first side wall layer and a second side wall layer extending along the side, wherein a thermal property of the first side wall layer differs from a thermal property of the second side wall layer; and wherein at least one of the first and second side wall layers is formed with a density that changes along a predetermined direction, wherein an amount or size of pores or cavities changes along the predetermined direction to cause the change of density.

2. The heat protective casing according to claim 1, wherein the first side wall layer is formed with a first density and the second side wall layer is formed with a second density, wherein the first density differs from the second density.

3. The heat protective casing according to claim 1, wherein at least one of the first and second side wall layers is formed with a structural orientation.

4. The heat protective casing according to claim 1, wherein the first side wall layer has a first structural orientation and the second side wall layer has a second structural orientation, wherein the first structural orientation differs from the second structural orientation.

5. The heat protective casing according to claim 1, wherein at least one of the first and second side wall layers comprises a predefined maximum thermal conductivity in a predefined direction.

6. The heat protective casing according to claim 1, wherein the thermal property is the thermal conductivity, wherein the first side wall layer has a first predefined maximum thermal conductivity in a first predefined direction, and the second side wall layer has a second predefined maximum thermal conductivity in a second predefined direction, wherein the absolute value of the first predefined maximum thermal conductivity differs from the absolute value of the second predefined maximum thermal conductivity and/or wherein the first direction differs from the second direction.

7. The heat protective casing according to claim 1, wherein the first and the second side wall layers are arranged with a distance to each other.

8. The heat protective casing according to claim 1, wherein the casing has an outer contact section for contacting a heat sink, wherein the total surface of the outer contact section is larger than the total surface of at least one outer side of the casing that is outside of the outer contact section.

9. The heat protective casing according to claim 1, wherein the first side wall layer is formed with a first filling level and the second side wall layer is formed with a second filling level, wherein the first filling level differs from the second filling level.

10. The heat protective casing according to claim 9, wherein at least one or each of the first and second side wall layers is formed by additive manufacturing.

11. The heat protective casing according to claim 9, wherein at least one or each of the first and second side wall layers is formed by additive manufacturing.

12. The heat protective casing according to claim 1, wherein at least one of the first and second side wall layers is formed with a base material and with a filler material in the base material.

13. The heat protective casing according to claim 12, wherein the base material is a polymer and the filler material is a composite material.

14. The heat protective casing according to claim 1, wherein the first side wall layer is formed with a first base material and with a first filler material in the first base material, and the second side wall layer is formed with a second base material and with a second filler material in the second base material, wherein the type and/or the relative filling level of the first filler material differs from the type and/or the relative filling level of the second filler material.

15. The heat protective casing according to claim 14, wherein the first base material comprises at least a first polymer and/or the second base material comprises at least a second polymer, wherein the type of the first polymer is the same as or differs from the type of the second polymer.

16. The heat protective casing according to claim 14, wherein the first filler material comprises at least a first composite material and/or the second filler material comprises at least a second composite material, wherein the type or a structural orientation of the first composite material is the same as or differs from the type or a structural orientation of the second composite material.

17. The heat protective casing according to claim 1, wherein the casing comprises an outer receptacle and an inner receptacle, wherein the outer shape of the inner receptacle is at least sectionwise complementary to an inner receiving volume of the outer receptacle.

18. The heat protective casing according to claim 17, wherein in a state in which the inner receptacle is placed in its inserted position, in which the inner receptacle is at least partly arranged in the receiving volume, a gap is present between the inner receptacle and the outer receptacle.

\* \* \* \* \*